Dec. 29, 1942.   G. LINDER   2,306,705
POT HOLDER
Filed Sept. 16, 1939   2 Sheets-Sheet 1

INVENTOR
GEORGE LINDER
BY James M. Obbett
ATTORNEY

Dec. 29, 1942. G. LINDER 2,306,705
POT HOLDER
Filed Sept. 16, 1939 2 Sheets-Sheet 2

INVENTOR
GEORGE LINDER
BY
James M. Abbett
ATTORNEY

Patented Dec. 29, 1942

2,306,705

UNITED STATES PATENT OFFICE 2,306,705

POT HOLDER

George Linder, Pasadena, Calif.

Application September 16, 1939, Serial No. 295,285

3 Claims. (Cl. 248—211)

This invention relates to a pot holder and is a continuation in part of my application entitled "Paint pot and brush holder," Serial No. 187,478, filed by me on January 28, 1938, now Patent No. 2,184,460.

In various industries, and particularly the painting industry, it is desirable to provide some means by which the paint pot may be supported upon a ladder. A common method of accomplishing this support is to hang the pot upon the rung of a ladder by a hook. When this method is used the pot or bucket is not held rigidly, thus there is a possibility for the contents of the pot to be spilled, and it is often necessary for the painter to hold the pot with one hand while wiping out a paint brush on the lip of the pot with the other hand. It is the object of the present invention to provide a pot holder adapted to be mounted upon a ladder and with which a pot or bucket may be instantly associated in a manner to be supported thereby while holding the pot rigidly, the structure further acting to make it possible for the pot to be instantly lifted from the support without manipulating any fastening means whatsoever. It is another object of the present invention to provide a pot supporting structure which may be readily mounted upon a ladder so that the supporting element may be instantly assembled or disassembled with the ladder, making it possible for the ladder to be conveniently moved from place to place, after which the structure may be reassembled therewith to support a pot for right or left-hand operations.

The present invention contemplates the provision of a fitting so designed as to be instantly applied to the rail of a ladder in an accurate position for use, and which fitting carries a detachable supporting arm designed to be rigidly held by the fitting when assembled therewith and at the outer end of which fitting a paint pot or bucket may be detachably secured in a manner to be supported and rigidly held.

The invention is illustrated by way of example in the accompanying drawings, in which:

Fig. 5 is an enlarged fragmentary view in section and elevation showing the manner in which the supporting arm engages the edge of the paint pot.

Figure 1:
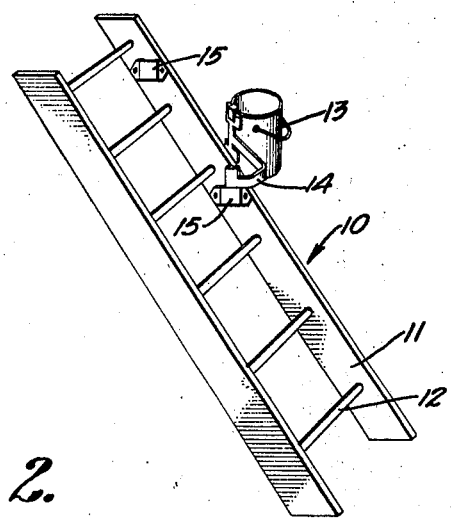
Figure 1 is a view in perspective showing a form of my invention and its application to a ladder.

Referring more particularly to the drawings, 10 indicates a ladder such as might be used by a painter or the like. This comprises the upright rails 11 and the intermediate rungs 12. It is desirable to support a paint pot upon a ladder in a manner to permit the pot to be readily removed or placed in position and to be rigidly held. The preferred form of the structure shown in the present application for accomplishing this result includes a rigid supporting arm 14 and a cleat 15 interengaging the same. A form of this supporting arm is shown in Fig. 2 of the drawings, where it will be seen to include a relatively long arm structure 16 which normally stands horizontal. At the outer end of this arm is a vertical bar 17 extending at right angles to the portion 16 and above and below the portion 16. The bar 17 is concave and is formed at its upper and lower ends with flanges 18. These flanges bear against the outer face of the pot 13, as will be hereinafter described. Formed as a part of these flanges and at the middle thereof are notches 19. The notches 19 engage fastening means to be hereinafter described. The portion 16 of the supporting arm has at its opposite end a length 20 bent substantially at right angles to the portion 16 and terminating in a returned bend portion 21. The returned bend portion 21 carries a transverse bar 22 having upper and lower extensions 23 and 24, respectively. It is to be understood that the portions 16, 20 and 21 of the arm 14 lie in the same plane and that the bars 17 and 22 extend transversely thereof. The extensions 23 and 24 of the bar 22 may be alternately used to engage the cleat 15 and thus hold the bar in its supported position, as indicated in Fig. 1.

Figure 4:
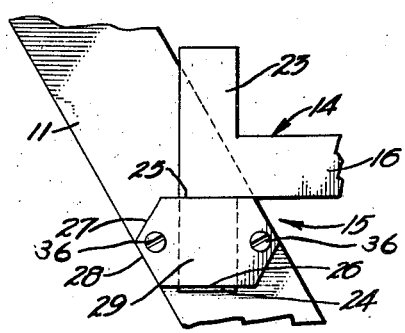
Fig. 4 is an enlarged fragmentary view showing the cleat for holding the supporting arm and the manner in which it is placed upon the rail of a ladder to properly receive the supporting arm and the manner in which it is detachably disposed.
Figure 3:
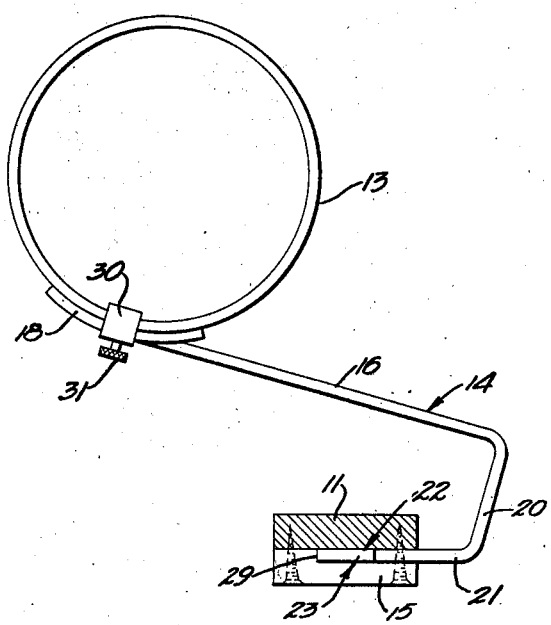

The cleat 15 is particularly shown in Fig. 4 of the drawings. Here it will be seen to be in the form of a plate having upper and lower parallel edges 25 and 26 and inclined edges 27 and 28 at the ends of the cleat. The angle of the inclined edges 27 and 28 is such that when one of the edges is substantially in alignment or parallel to an edge of the ladder rail 11 the parallel edges 25 and 26 will stand substantially horizontal when the ladder is disposed at a usual working angle. Extending downwardly through the cleat from parallel edge 25 to parallel edge 26 is a slotted opening 29 which receives one of the members 23 or 24. When the member 24, for example, extends downwardly through the slotted opening 29 forming a socket seat for either the member 23 or 24. As shown in Fig. 4, the lower edge of the portion 16 of the arm 14 will rest upon the face 25 of the cleat. Thus, the arm will be held temporarily in a rigid condition as it extends horizontally. It will also be seen that due to the manner in which the arm structure is bent upon itself the outer end of the arm carrying the vertical bar 17 will be disposed in a position to conveniently support the paint pot 13 without interfering with movement of the painter up and down the ladder. The paint pot 13 is conveniently supported at the free end of the supporting arm 14. This is brought about by the use of a removable U-shaped clip 30 which embraces the lip of the side wall of the paint pot 13 and is set in position by a set screw 31 extending through a threaded bore in the outer leg of the clip. The width between the legs of the clip is sufficient to accommodate the thickness of the wall of the bucket and to permit the vertical bar 17 to be introduced between the outer face of the wall of the bucket and the outer leg of the clip, as shown in Fig. 5. When in this position the portion of the set screw 31 which extends between the outer leg of the clip and the face of the bucket will seat in the uppermost notch 19 of the vertical bar. Thus, the screw 31 will be fixed to the paint pot 13 and when the set screw 31 is positioned in the notch 19 the pot will be supported by the arm 14. Attention is directed to the fact that the vertical bar 17 with its arcuate flanges 18 will conform to the circumferential surface of the paint pot. It is to be pointed out also that due to the fact that a portion of the bar 17 extends below the arm 16 and carries arcuate flanges 18 which will conform to the paint pot 13 and will provide a steady-rest for the paint pot. The pot, rigidly held, will not be displaced from its mounting during normal operations. It will also be seen that due to the rigid holding of the paint pot the painter may manipulate a paint brush with relation to the paint pot and properly wipe the paint out of it.

Figure 6:
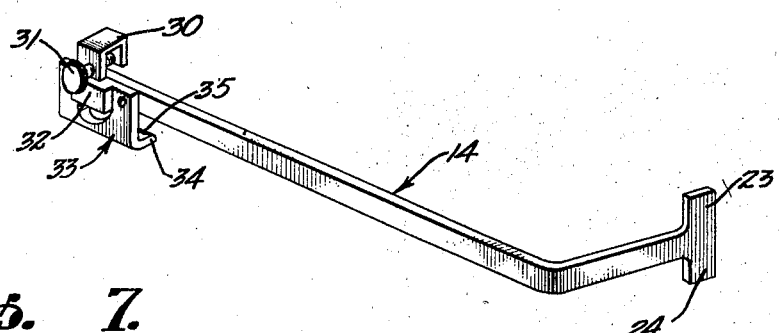
Fig. 6 is a view in perspective showing another form of the invention.

In the form of the invention shown in Fig. 6 the outermost leg of the clip 30 is provided with a downwardly extending portion which projects into a socket 32 carried by a plate 33 secured to a different form of supporting arm 14. This plate extends downwardly and has an inturned lip 34 at its lower end formed with an arcuate face 35 which conforms to the circumference of the pot 13 and by which the pot is steadied vertically when supported thereon.

Figure 2:
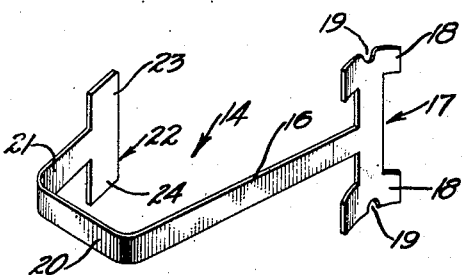
Fig. 2 is an enlarged view in perspective showing the paint pot supporting arm.
Figure 3:
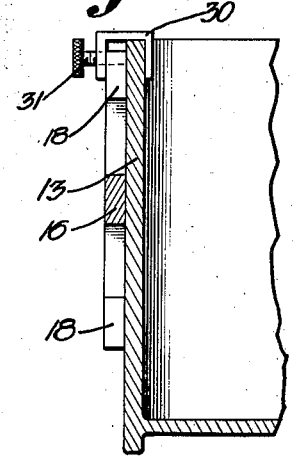
Fig. 3 is a view in plan showing the paint pot supporting arm and the manner in which it may be detachably mounted on a rail of a ladder.

It will be evident that in either of the forms of the invention shown in Figs. 1 or 6 the paint pot may be instantly removed from the supporting arm and that the arm structure will be instantly detachable from the supporting cleat 15.

Figure 7:
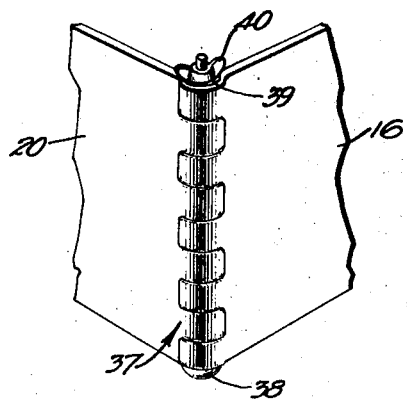
Fig. 7 is a fragmentary view in perspective showing a form of the present invention in which the supporting arm is provided with a hinge at a point in its length.

It may be desirable to adjust the position of the paint pot 13 with relation to the ladder. This may be done by placing a hinge in the supporting arm 14 at some convenient point such for example as at the junction of the portion 16 and 20. Such a construction is shown in Fig. 7, where it will be seen that a hinge structure 37 which includes a pintle bolt 38 is used. This bolt is provided at its upper end with a washer 39 and a wing nut 40 by which the hinge may be clamped to hold it temporarily against rotation.

In operation of the present invention the structure is provided in either of the forms here indicated, after which one or more cleats are secured to the rail of the ladder by screws 36. When these cleats are applied care is taken to see that inclined edges of the cleats are in alignment with the edges of the rail 11 of the ladder. This will dispose the cleats horizontally when the ladder is inclined at a suitable working angle and will make it possible to quickly apply the cleats without making any measurements. The supporting arm 14 may then be applied as desired by inserting one of the portions 23 or 24 of the bar 22 in the slot 29 of the cleat. This will cause the supporting arm to be held rigidly, after which a clip 30 may be secured over the lip of the paint pot 13. The paint pot may then be disposed to rest upon the upper end of the bar 17 with the set screw 31 positioned within the seat 19. Thus, the weight of the paint pot will hold the set screw 31 in its seat and the vertical bar 17 will act to steady the paint pot so that it will remain in a fixed position until it is desired to remove it. This may be done instantly by lifting the paint pot and the clip 30 from engagement with the vertical bar 17 and the supporting arm 14.

Attention is directed to the fact that the opposite extensions of the transverse bar 22 forming a part of the supporting arm 14 makes it possible for the bar to be reversed in its seated position within the cleat 15. It will also be evident that the vertical bar 17 at the opposite end of the arm 14 is reversible since it has the notches 19 at its opposite ends and arcuate flanges 18. This makes it possible to support the paint pot 13 thereon in either position the arm assumes. It will also be evident that the extension of the bar position 22 which projects above the cleat when seated will bear against the side face of the ladder rail 11 and cooperate with the cleat in holding the supporting arm horizontally and rigid. By reference to Fig. 5 of the drawings it will be seen that the set screw 30 is held in the upper notch 19 of the portion 17 by gravity and that the weight of the pot 13 swings toward the member 17 so that the arcuate portions 18 will act to center the pot and prevent it from being displaced.

It will thus be seen that by the arrangement here disclosed a ladder may be conveniently and quickly prepared for use with the present invention, after which the supporting arm may be instantly assembled with the cleat on the ladder so that the arm will be held without the use of any fastening means and at the same time a support will be provided for the paint pot, permitting it to be instantly supported by the supporting arm or removed therefrom without requiring detachment, the structure being decidedly simple in its construction, strong and durable.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. In a pot holding structure to be applied to ladders and the like, a socket member permanently carried on the rail of the ladder, said socket member having an upper face disposed horizontally when the ladder is in its normally inclined position and an inclined face adapted to lie parallel to the inclined vertical edge of a ladder rail, said socket structure being formed with a socket disposed at right angles to the normally horizontal face, and means for securing the socket member to the rail of the ladder.

2. A pot holding structure to be applied to ladders and the like, comprising in combination with a socket member permanently carried on the rail of the ladder, said socket member having an upper face disposed horizontally when the ladder is in its normally inclined position and an inclined face adapted to lie parallel to the inclined vertical edge of a ladder rail, said socket structure being formed with a socket disposed at right angles to the normally horizontal face, means for securing the socket member to the rail of the ladder, and a pot supporting member having a rigid longitudinal arm formed with a protruding element at right angles thereto to project into said socket while the arm rests upon the horizontal face of the socket member and extends horizontally, said arm being formed at its outer end with a pot engaging support.

3. A pot holding structure to be applied to ladders and the like, comprising in combination a cleat permanently carried on the rail of the ladder, said cleat having an upper face disposed horizontally when the ladder is in its normally inclined position and a socket extending vertically from said upper face, a pot supporting member having a rigid longitudinal arm formed at one end with a T-shaped head, either leg of which may fit within said socket while the arm rests upon the upper face of the cleat, the length of the arm being curved so that its opposite end will stand at the side of the rail of the ladder, a T-shaped head on said opposite end arcuate in cross-section to conform to the outer surface of a pot, a clip detachably secured to the lip of the pot, and seats formed in the opposite ends of the T-shaped head into which said clip may fit and by which the pot may be supported.

GEORGE LINDER.